(12) United States Patent
LeBlanc et al.

(10) Patent No.: US 10,585,863 B2
(45) Date of Patent: Mar. 10, 2020

(54) SYSTEMS AND METHODS FOR PROVIDING INFORMATION SERVICES ASSOCIATED WITH NATURAL RESOURCE EXTRACTION ACTIVITIES

(71) Applicant: IHS Global Inc., Englewood, CO (US)

(72) Inventors: Raoul LeBlanc, Houston, TX (US); Joseph McKeown, Houston, TX (US)

(73) Assignee: IHS GLOBAL INC., Englewood, CO (US)

( * ) Notice: Subject to any disclaimer, the term of this patent is extended or adjusted under 35 U.S.C. 154(b) by 150 days.

(21) Appl. No.: 15/186,205

(22) Filed: Jun. 17, 2016

(65) Prior Publication Data

US 2016/0369616 A1    Dec. 22, 2016

Related U.S. Application Data

(60) Provisional application No. 62/181,682, filed on Jun. 18, 2015, provisional application No. 62/187,202, filed on Jun. 30, 2015, provisional application No. 62/348,315, filed on Jun. 10, 2016.

(51) Int. Cl.
*G06F 16/215* (2019.01)
*G06F 16/25* (2019.01)

(52) U.S. Cl.
CPC .......... *G06F 16/215* (2019.01); *G06F 16/254* (2019.01)

(58) Field of Classification Search
CPC ........................................................ G06F 17/30
USPC ............................................................ 702/13
See application file for complete search history.

(56) References Cited

U.S. PATENT DOCUMENTS

| 6,574,565 B1 * | 6/2003 | Bush ........................ G01V 1/30 702/13 |
| 2015/0278407 A1 * | 10/2015 | Vennelakanti .......... E21B 43/00 703/7 |
| 2017/0067323 A1 * | 3/2017 | Katterbauer ............ E21B 41/00 |

* cited by examiner

*Primary Examiner* — Ricky Ngon
(74) *Attorney, Agent, or Firm* — Faegre Baker Daniels LLP

(57) ABSTRACT

A processor-based system utilizes analytical techniques that organize large volumes of hydrocarbon well data around spatial patterns, well characteristics, and/or calculated performance measurements in order to analyze the large volumes of well data faster and more efficiently. For example, one embodiment uses a custom-created library of metadata and rules that enables the underlying processor-based system to transform large volumes of oil and gas well data into a more organized and efficient database, saving many hours of labor. In particular, some of the organizational techniques include combinations of over 100 descriptors for each well, a variety of well-ranking regimes (such as Tiers, Quintiles, and Deciles), production profiles, and other groupings (such as Play Type, Operator Class, and the like).

10 Claims, 8 Drawing Sheets

SYSTEMS AND METHODS FOR PROVIDING INFORMATION SERVICES ASSOCIATED WITH NATURAL RESOURCE EXTRACTION ACTIVITIES

RELATED APPLICATIONS

This application claims priority to U.S. Provisional Patent Application Nos. 62/181,682, filed on Jun. 18, 2015; 62/187,202, filed on Jun. 30, 2015, and 62/348,315, filed on Jun. 10, 2016, each of which is incorporated herein by reference in its entirety, including the Appendices provided therein.

BACKGROUND

The drilling and completion technological advances that transformed the unconventional oil and gas plays into economically viable plays has reshaped the oil and gas supply-demand balance with worldwide implications—becoming a disruptive technology in the process. Energy companies seek innovative solutions for coping with their own success, which have created dramatic energy supply increases. Understanding and identifying oil and gas plays, production characteristics of existing wells, and the like, can facilitate beneficial decision-making. Existing technologies for creating this type of analysis are inadequate and provide less information than what is needed or desired.

In particular, and as a result of this advancement, the amount of information regarding oil and gas wells has multiplied exponentially, creating vast amounts of related data covering thousands of individual wells. This information explosion has far outpaced the ability for conventional computing systems to efficiently organize and process this information, resulting in valuable insights remaining buried underneath mounds of data. Stated differently, due the technical nature of conventional computing systems, those systems deal with data entries on an entry-by-entry basis, which creates inefficiencies and wastes resources as each entry is individually analyzed. Furthermore, such an approach can miss important insights from the data. Accordingly, there exists a need for a technological solution that provides improved data organization for a processor-based system in order to glean and present important insights from the large volumes of data relating to oil and gas wells. As discussed below, embodiments of the present disclosure are directed to such technical solutions and provide specific rule-based approaches to organizing and processing data for oil and gas wells. These advancements provide increased speed and efficiency over conventional computing systems and further enable a user to access insights unavailable through conventional computing approaches.

SUMMARY

Embodiments of the present disclosure provide a technological solution that provides improved organizational approaches for a processor-based system in order to glean and present important insights from large volumes of data relating to oil and gas wells. For example, some embodiments utilize analytical techniques that are organized around spatial patterns, well characteristics, and/or calculated performance measurements in order to provide a more efficient and faster processing approach over conventional systems, which by their nature are unable to effectively process large amounts of data and provide these insights from that data.

Some embodiments provide a system that uses a custom-created library of metadata that enables the system to transform large volumes of oil and gas well data into a more organized and efficient database, saving many hours of labor. In particular, some of the organizational techniques include combinations of over 100 descriptors for each well, a variety of well-ranking regimes (such as Tiers, Quintiles, and Deciles), production profiles, and other groupings (such as Play Type, Operator Class, and the like).

Some embodiments pre-organize the well data along spatial patterns, well characteristics, and/or calculated performance measurements and create a new layer of data, (e.g., header data) to facilitate the organizational structure of the well database. As a result, these embodiments are able to produce more meaningful analysis of the well data in a more efficient manner than conventional systems. For example, with this organization, these embodiments systems can automatically and simultaneously search along distinct categories of well information in order to quickly provide a more meaningful set of search results in less time, as compared to conventional systems.

Embodiments of the present disclosure include methods, systems, and/or computer-readable media configured to provide an information service associated with hydrocarbon wells, geothermal wells, and/or other natural resource extraction activities. Providing the information service may include obtaining an information set; generating evaluation information based on the information set; and facilitating display of the evaluation information, as discussed in more detail below.

In an Example 1, a method of providing an information service comprises obtaining an information set comprising information items associated with a plurality of hydrocarbon wells; applying one or more filter criteria to the set of information to create a filtered set of information; grouping each information item of the filtered set of information; generating, based on the filtered set of information, evaluation information, the evaluation information comprising a performance metric corresponding to at least one well of the plurality of hydrocarbon wells; and facilitating display of a representation of the evaluation information.

In an Example 2, the method of Example 1 is used, wherein grouping each information item of the filtered set of information comprises obtaining well characteristic information associated with a first well, wherein a first subset of information items of the filtered set of information corresponds to the first well; determining, based on the well characteristic information associated with the first well, a well group corresponding to the first well; and associating the first subset of information items with the well group corresponding to the first well.

In an Example 3, the method of Example 2 is used, wherein the well group corresponding to the first well comprises one of (a) main well, production, and completions; (b) spuds and permits; and (c) pre-2001 wells that are still producing.

In an Example 4, the method of any of Examples 1-3 is used, further comprising standardizing at least a portion of the filtered set of information by determining, for each well, a wellhead barrel oil equivalent (BOE), wherein the wellhead BOE represents a standardized measure of a volume of oil and/or gas produced by the well during a specified month, divided by the total number of days in the specified month.

In an Example 5, the method of any of Examples 1-4 is used, wherein the performance metric comprises a peak production metric, the peak production metric comprising at least one of peak production, peak BOE production, peak BOE(market) production, peak gas production, peak oil production, peak production per 1000 feet of lateral length, peak BOE production per 1000 feet of lateral length, peak BOE(market) production per 1000 feet of lateral length, peak gas production per 1000 feet of lateral length, and peak oil production per 1000 feet of lateral length.

In an Example 6, the method of any of Examples 1-5 is used, wherein generating the evaluation information further comprises categorizing each information item of the filtered set of information, the categorizing comprising determining quintiles associated with the performance metric; and associating each information item with a quintile corresponding to the well with which the information item is associated.

In an Example 7, the method of any of Examples 1-6 is used, wherein generating the evaluation information further comprises categorizing each information item of the filtered set of information, the categorizing comprising determining tiers associated with the performance metric; and associating each information item with a tier corresponding to the well with which the information item is associated.

In an Example 8, the method of any of Examples 1-7 is used, wherein generating the performance metric comprises calculating a measure of performance of each well; and deriving, for each well, the performance metric using a function that takes, as input, the measure of performance and a well characteristic.

In an Example 9, the method of Example 8 is used, wherein the well characteristic comprises a value of at least one of a play, a play sub-region, a play type, an American Petroleum Institute (API) gravity, an API gravity range, an azimuth, a basin, a lifestage, a section name, an operator, an operator type, a peak status, a rate, a lateral length, and a well orientation.

In an Example 10, one or more computer-readable media having computer-executable instructions embodied thereon for facilitating providing an information service, the instructions configured to be executed by a processor to cause the processor to instantiate at least one component, the at least one component comprising a retrieving component configured to obtain, from an information source, an information set, the information set comprising a set of information items associated with a plurality of hydrocarbon wells; an analysis component configured to analyze the information set to generate a set of evaluation information, the set of evaluation information comprising at least one of a data file and a visualization template, wherein the evaluation information comprises at least one performance metric associated with at least one hydrocarbon well; and a database configured to store the evaluation information.

In an Example 11, the media of Example 10 is used, the analysis component comprising a cleaning/validating component configured to apply one or more filter criteria to the set of information to create a filtered set of information; a staging component configured to generate the at least one performance metric; and an aggregating component configured to categorize the at least one well based on the at least one performance metric.

In an Example 12, a system for facilitating providing an information service comprises a server, the server comprising a processor configured to executed one or more computer-readable instructions in a memory that, when executed, cause the processor to instantiate at least one component, the at least one component comprising: a retrieving component configured to obtain, from an information source, an information set, the information set comprising a set of information items associated with a plurality of hydrocarbon wells; an analysis component configured to analyze the information set to generate a set of evaluation information, the set of evaluation information comprising at least one of a data file and a visualization template, wherein the evaluation information comprises at least one performance metric associated with at least one hydrocarbon well; and a database configured to store the evaluation information.

In an Example 13, the system of Example 12 is used, further comprising a user device configured to communicate with the server, the user device comprising a processor configured to instantiate a user interface, wherein the user interface is configured to receive, from a user, a request for the performance metric.

In an Example 14, a method of providing an information service comprises obtaining an information set comprising information items associated with a plurality of hydrocarbon wells; generating, based on the filtered set of information, evaluation information, the evaluation information comprising a performance metric corresponding to at least one well of the plurality of hydrocarbon wells, wherein generating the evaluation information comprises categorizing each information item of the filtered set of information, the categorizing comprising: determining quintiles associated with the performance metric; and associating each information item with a quintile corresponding to the well with which the information item is associated; and facilitating display of a representation of the evaluation information.

In an Example 15, a method of providing an information service comprises obtaining an information set comprising information items associated with a plurality of hydrocarbon wells; generating, based on the filtered set of information, evaluation information, the evaluation information comprising a performance metric corresponding to at least one well of the plurality of hydrocarbon wells, wherein generating the evaluation information comprises categorizing each information item of the filtered set of information, the categorizing comprising: determining tiers associated with the performance metric; and associating each information item with a tier corresponding to the well with which the information item is associated; and facilitating display of a representation of the evaluation information.

Figure 1:
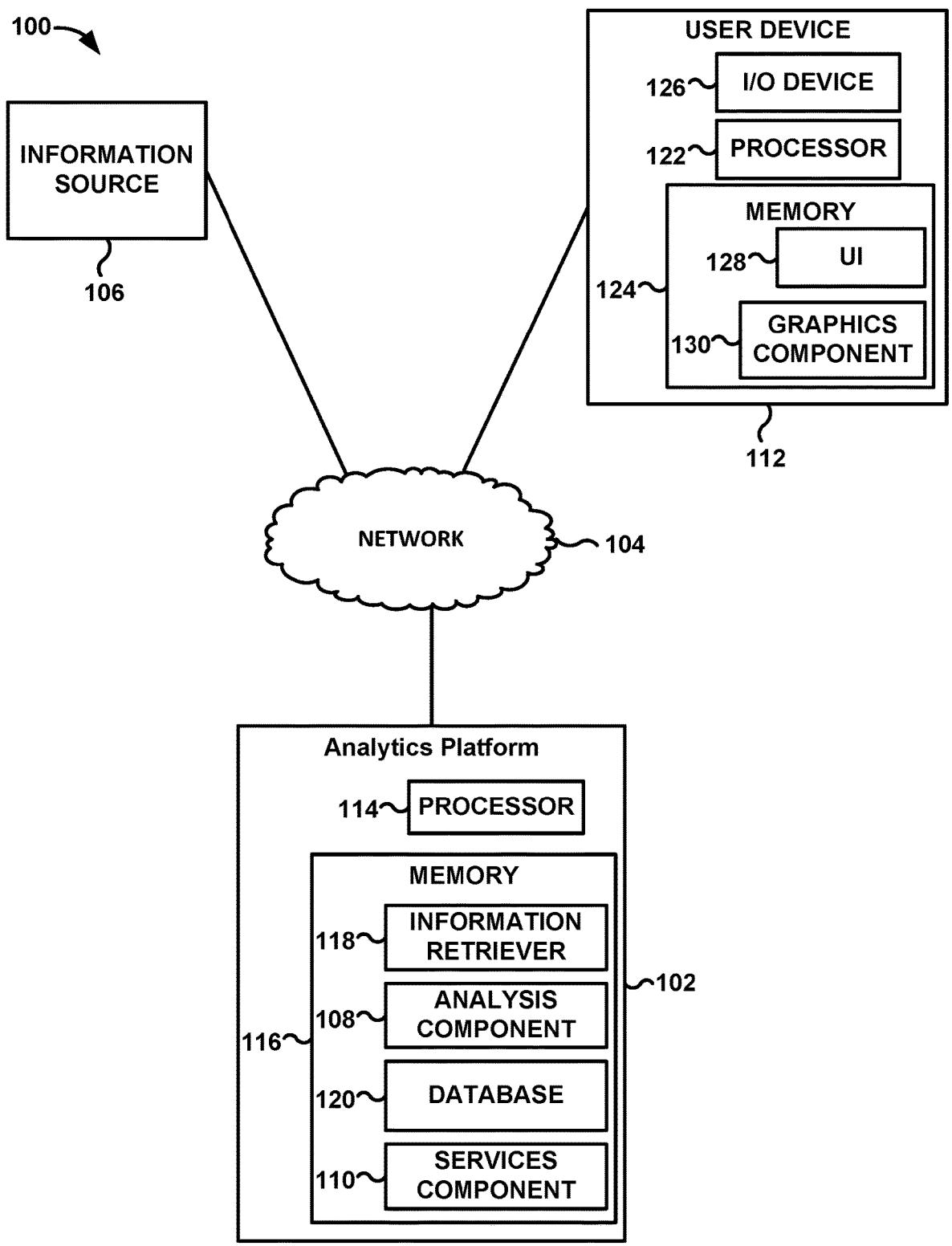
FIG. 1 is a block diagram illustrating an operating environment (and, in some embodiments, aspects of the present disclosure), in accordance with embodiments of the present disclosure.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

Embodiments of the present disclosure provide a technological solution that provides improved organizational approaches for a processor-based system in order to glean and present important insights from the large volumes of data relating to oil and gas wells. For example, some embodiments utilize analytical techniques that are organized around spatial patterns in order to provide a more efficient and faster processing approach over conventional processing systems, which by their nature are unable to effectively process large amounts of data and provide these insights from that data. With these improved organizational approaches, embodiments of the disclosure provide an organized, categorized information service that makes evaluation information, in data files, pre-designed visualization templates, and/or the like, available to user devices, and may be fully customizable to enable well-level analysis on a deep level. In some embodiments, evaluation information files may be updated periodically (e.g., monthly) and may be delivered via File Transfer Protocol (FTP) for local access to the information. Embodiments of the disclosure facilitate mapping and investigating plays, regions, and customizable well groups across multiple dimensions such as, for example, peak production (which may be, e.g., absolute and/or normalized per lateral foot), lateral footage, completion intensity, decline rates, American Petroleum Institute (API) gravity, private vs public operators, and/or the like. Embodiments of the disclosure may facilitate understanding relative and absolute well productivity at various levels of granularity; evaluating performance and analyzing trends over time; benchmarking well, asset, company and portfolio performance against competitors; screening and proactively identifying opportunities quickly and efficiently; analyzing production curves for oil, gas, and water using monthly data; and/or the like.

FIG. 1 depicts an example of an operating environment 100 (and, in some embodiments, aspects of the present disclosure) in accordance with embodiments of the present disclosure. As shown in FIG. 1, the operating environment 100 includes an analytics platform that obtains information, via a network 104, from an information source 106. The network 104 may be, or include, any number of different types of communication networks such as, for example, a short messaging service (SMS), a local area network (LAN), a wireless LAN (WLAN), a wide area network (WAN), the Internet, or the like. The information source 106 may include, for example, the Internet, a database, an information service, a website, or the like. According to embodiments, the analytics platform 102 implements an analysis component 108 that uses the obtained information to perform analysis of information associated with hydrocarbon wells, geothermal wells, and/or the like. Although embodiments of the disclosure refer to analysis of information associated with any number of different kinds of wells and other natural resource extraction activities, the particular example of hydrocarbon wells will be used throughout this disclosure to illuminate various aspects of embodiments of the present disclosure. References to hydrocarbon wells, in lieu of other types of wells or other natural resource extraction activities, are not meant to imply any limitation of the scope of the disclosed subject matter, but are used solely for purposes of clarity. The analytics platform 102 may use the analysis to facilitate any number of information-related services such as, for example, by utilizing a services component 110, which a consumer of the services may access with a user device 112.

As shown in FIG. 1, the analytics platform 102 may incorporate various hardware components, including a processor 114 and a memory 116. The analysis component 108 may be stored in the memory 116. In embodiments, the processor 114 executes the analysis component 108, which may facilitate analysis of information to classify hydrocarbon wells, determine metrics associated with hydrocarbon well performance, identify trends associated with hydrocarbon plays, and/or the like.

The analytics platform 102 includes an information retriever 118 that receives, copies, or otherwise obtains information from the information source 106. The information retriever 118 may store the information, portions of the information, and/or data extracted from the information, in the memory 116 and may, for example, index the information using a database 120. The database 120, which may refer to one or more databases, may be, or include, one or more tables, one or more relational databases, one or more multi-dimensional data cubes, and/or the like. Further, though illustrated as a single component implemented in the memory 116, the database 120 may, in fact, be a plurality of databases 120 such as, for instance, a database cluster, which may be implemented on a single computing device or distributed between a number of computing devices, memory components, and/or the like.

As is further shown in FIG. 1, the user device 112 may be implemented on a computing device that includes a processor 122, a memory 124, and an input/output (I/O) device 126. A user interface (UI) 128 may be stored in the memory 124 and may facilitate interaction with evaluation information received from the analytics platform 102, and/or interaction with the analytics platform 102 itself. The UI 128 may include and/or interact with a graphics component 130 that may be configured to facilitate presentation of graphical representation of one or more aspects of the evaluation information. For example, in embodiments, the UI 128 and graphics component 130 may be provided by an third-party visualization application such as the visualization application provided by Tableau Software, of Seattle, Wash. In embodiments, the processor 122 executes the UI 128 and/or the graphics component 130. The visualizations may be enhanced using any number of other types of information such as, for example, geologic information, land use, land ownership boundary information, and/or the like.

In operation, the analysis component 108 accesses obtained information (e.g., from the memory 116, the information retriever 118, and/or the like) and analyzes the information to generate evaluation information. Evaluation information refers to any information that may be provided to a user and may include the obtained information, a portion of the obtained information, classifications, categories, performance metrics, trends, and/or the like. The evaluation information may be used to facilitate one or more services. In embodiments, aspects of the services may be provided using the services component 110 which may include, for example, applications, service functions, and/or the like that provide visualization templates, data files, reports, graphs, information for generating products, and/or the like. Additionally, the analytics platform 102 may facilitate (e.g., by providing information) generation of products based on evaluation information and/or may provide evaluation information to other entities for use in generating products and/or services. For example, in embodiments, the services component 110 may be configured to generate visualization templates that are configured to cause the UI 128 and/or the graphics component 130 to present representations of evaluation information. The templates may be configurable and may facilitate visualization of the data and any number of different selectable levels, which may be collapsed, expanded, and/or otherwise manipulated. Evaluation information, products, and/or services may be organized according to play, sub-play, operators, depth, and/or the like. For example, the analytics platform 102 may identify a plurality of wells that share similar characteristics, such as well type, geographic location, vintage, play/subplay, and/or the like. The analytics platform 102 then collapses the data for those wells in order to collectively represent those wells as a single data set (i.e., as if there was only a single well). Collapsing the data may involve, e.g., taking a mean, a mode, a weighted average, or the like, of the data. In this manner, the analytics platform 102 facilitates a review of larger number of wells.

According to embodiments, and as indicated above, various components of the operating environment 100, illustrated in FIG. 1, can be implemented on one or more computing devices. For example, each of the analytics platform 102, the information source 106, and the user device 112 may be, or reside in, one or more computing devices. A computing device may include any type of computing device suitable for implementing embodiments of the disclosure. Examples of computing devices include specialized computing devices or general-purpose computing devices such "workstations," "servers," "laptops," "desktops," "tablet computers," "hand-held devices," and the like, all of which are contemplated within the scope of FIG. 1 with reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory (e.g., memory 116 and/or 124) includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to encode information and can be accessed by a computing device such as, for example, quantum state memory, and the like. In embodiments, the memory (e.g., memory 116 and/or 124) stores computer-executable instructions for causing the processor (e.g., processor 114 and/or 122, respectively) to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include the analysis component 108, the services component 110, the information retriever 118, the database 120, the UI 128, and the graphics component 130. Some or all of the functionality contemplated herein may also be implemented in hardware and/or firmware.

The illustrative operating environment 100 shown in FIG. 1 is not intended to suggest any limitation as to the scope of use or functionality of embodiments of the present disclosure. Neither should the illustrative operating environment 100 be interpreted as having any dependency or requirement related to any single component or combination of components illustrated therein. Additionally, any one or more of the components depicted in FIG. 1 may be, in embodiments, integrated with various ones of the other components depicted therein (and/or components not illustrated), all of which are considered to be within the ambit of the present disclosure.

Figure 2:
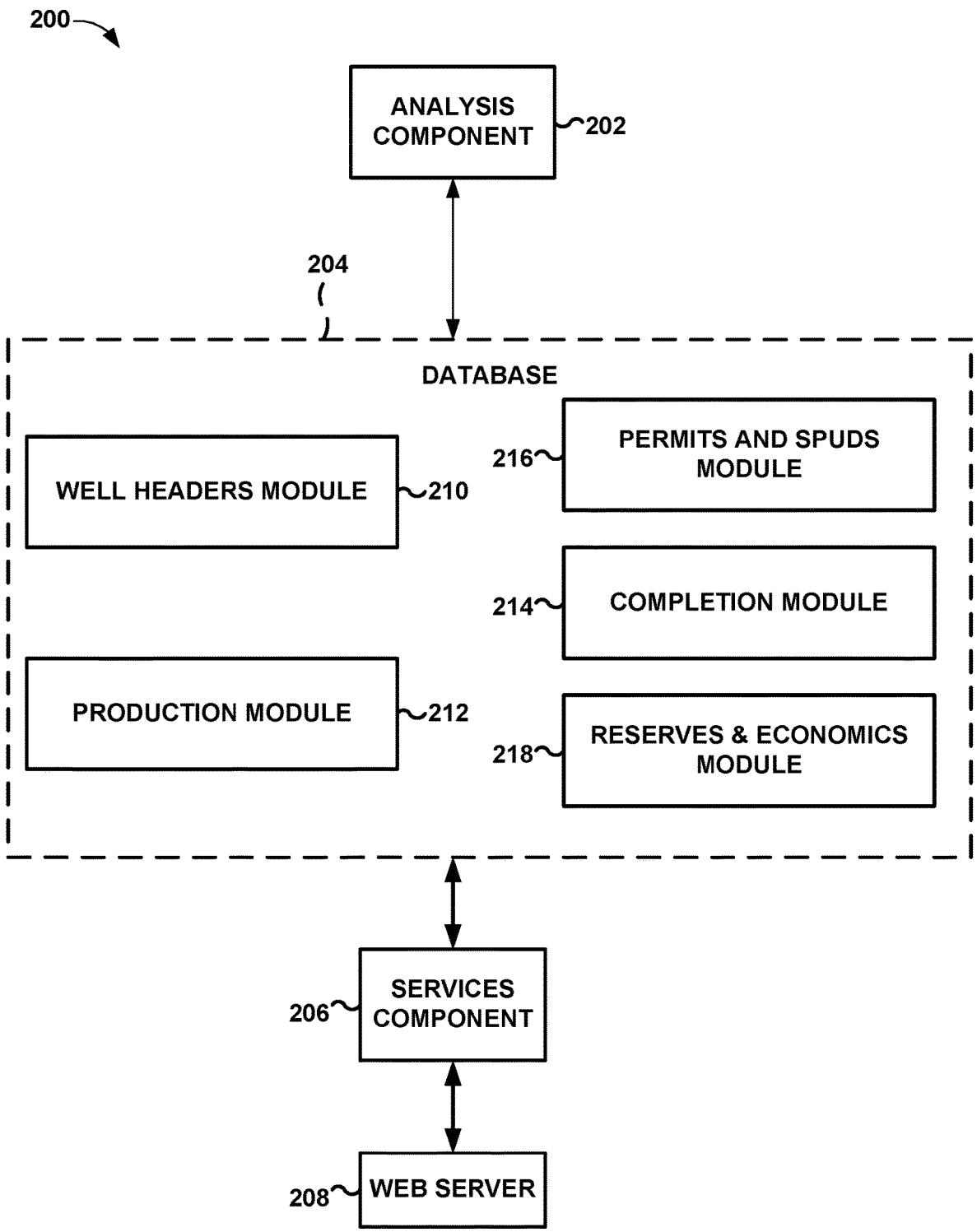
FIG. 2 is a block diagram illustrating another operating environment (and, in some embodiments, aspects of the present disclosure), in accordance with embodiments of the present disclosure.

FIG. 2 is a block diagram depicting another illustrative operating environment 200, which may include, for example, components of an illustrative server (e.g., the analytics platform 102 shown in FIG. 1) in accordance with embodiments of the present disclosure. As indicated above, the analysis component 202 may be configured to analyze information associated with hydrocarbon wells, and to save the results of the analysis (referred to herein as "evaluation information") in a database 204. The evaluation information may be used to facilitate providing services to consumers (e.g., by making the results of the analyses available). For example, a services component 206 may interact with a web server 208 may be used to provide one or more web pages accessible by consumer devices (e.g., the user device 112 depicted in FIG. 1). The web server 208 may facilitate providing evaluation information to the user device. In embodiments, the user device may utilize a browser, plug-in, client application, and/or the like, to access services via the web server 208. According to embodiments, the evaluation information may be provided to the user device and/or may be used to generate other products and/or services that may be made available to user devices. In embodiments, the evaluation information may be provided in the form of data files (e.g., comma separated values (.csv) files), visualization templates (e.g., Tableau templates, SpotFire templates, etc.), and/or the like. Non-limiting, illustrative templates are shown, for example, in Appendices C and D that accompany this description which are incorporated by reference.

The database 204 (which may be, include, or be included in the database 120 depicted in FIG. 1) may be organized by indexing the evaluation information according to a number of modules, as shown in FIG. 2. As shown in FIG. 2, the database 204 may include a well headers module 210, a production module 212, a completion module 214, a permits and spuds module 216, and a reserves and economics module 218. Each of the modules 210, 212, 214, 216, and 218 may include one or more sets of evaluation information and/or one or more categories or types of evaluation information, and may be preconfigured, dynamically configured based on user requests, and/or the like. According to embodiments, any one or more of the modules 210, 212, 214, 216, and 218 of the database 204 depicted in FIG. 2 may share resources with, have overlapping data with, be linked to (e.g., as part of a relational database), or be integrated with, various ones of the other modules depicted therein (and/or components not illustrated). Additionally, any one or more of the modules 210, 212, 214, 216, and 218 may reside on the analytics platform 102 and/or the user device 112, and/or may be distributed between the analytics platform 102 and the user device 112. A non-limiting example of the database 204 includes the North America Performance Evaluator, available from IHS, Inc. of Englewood, Colo., various details of which are described in the appendices accompanying this description, each of which are incorporated herein by reference in their entireties.

According to some embodiments, the well headers module 210 may include evaluation information associated with well headers and may include headers files, well headers information classified at the state-level ("state-level breakouts"), well headers information associated with well operators ("operator breakouts"), well headers information associated with specific basins ("basin breakouts"), well headers information associated with specific plays and/or sub-plays ("play breakouts"), well headers information associated with specific vintages ("vintage breakouts"), well headers visualization templates, play-level (and/or sub-play-level) visualization templates, peak production fundamentals analysis visualization templates, and/or the like.

The production module 212 may include evaluation information associated with well production and may include play files with integrated production data, production visualization files, fundamental analysis visualization templates for oil and gas (e.g., vintage production, base/wedge analysis, etc.), and/or the like.

The completion module 214 may include evaluation information associated with well completions and/or hydraulic fracturing service companies and/or completions, and may include absolute water and proppant volume/type data files and/or visualization templates, per-foot metrics (e.g., hydraulic fracture intensity, etc.) data files and/or visualization templates, completion information integrated with peak production metrics data files and/or visualization templates, and/or the like.

The permits and spuds module 216 may include evaluation information associated with issued permits and spuds (well-sites at the beginning stages of drilling) and may include location-level data files and/or visualization templates, operator-level data files and/or visualization templates, oil/gas ratio predictions associated with plays and/or sub-plays, productivity predictions associated with plays and/or sub-plays, and/or the like.

The reserves and economics module 218 may include evaluation information associated with reserves and economic considerations and may include mechanically generated reserves data files and/or visualization templates, estimated current cost per category data files and/or visualization templates, economic metrics and/or breakeven prices data files and/or visualization templates, high-level cash flow stream data files and/or visualization templates, and/or the like. In embodiments, the reserves and economics module 218 may be configured to facilitate review of financial performance of assets, companies, and portfolios.

The illustrative operating environment 200 shown in FIG. 2 is not intended to suggest any limitation as to the scope of use or functionality of embodiments of the present disclosure. Neither should the illustrative operating environment 200 be interpreted as having any dependency or requirement related to any single component or combination of components illustrated therein. Additionally, any one or more of the components depicted in FIG. 2 may be, in embodiments, integrated with various ones of the other components depicted therein (and/or components not illustrated), all of which are considered to be within the ambit of the present disclosure.

Figure 3:
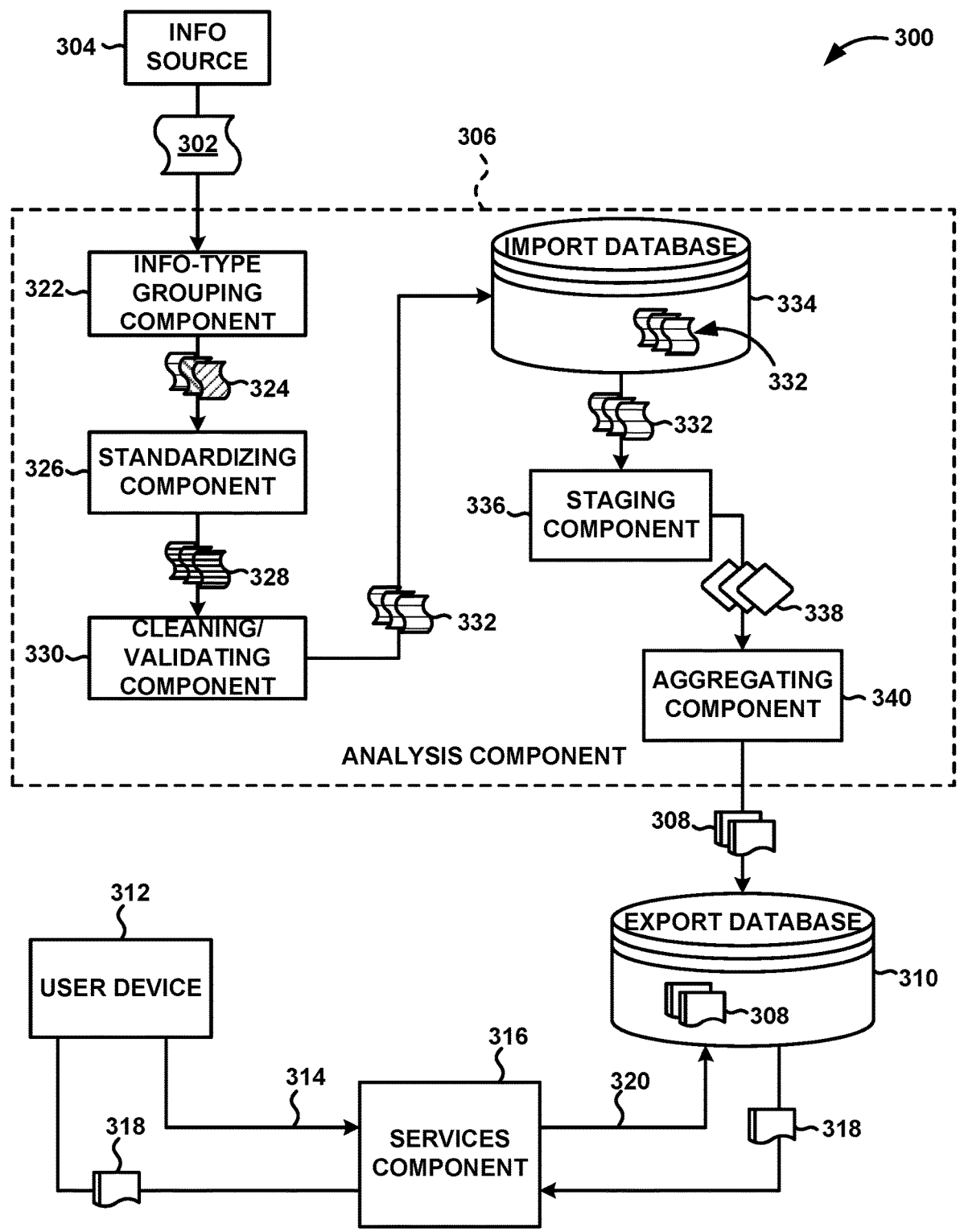
FIG. 3 is a schematic diagram depicting an illustrative process of analyzing information, in accordance with embodiments of the present disclosure.

FIG. 3 is a schematic diagram depicting an illustrative process 300 for providing an information service in accordance with embodiments of the disclosure. As shown, information 302 is obtained from an information source 304. The information source 304 may include one or more databases, one or more data services, and/or the like. For example, the information source 304 may include a data depository maintained by a state or federal agency in which publicly-available information associated with oil and gas well is maintained. The information 302 may be obtained by an information retriever such as, for example, the information retriever 118 depicted in FIG. 1, and provided to an analysis component 306. The analysis component 306 may be, or may be similar to, the analysis component 108 depicted in FIG. 1 and/or the analysis component 202 depicted in FIG. 2. According to embodiments, the analysis component 306 may be configured to analyze the information 302 to generate evaluation information 308 that may be stored in an export database 310. The analysis component 306 may utilize any number of different models, formulas, algorithms, classifiers, and/or the like to analyze the information 302 to generate evaluation information 308. As described above, the evaluation information 308 may include one or more data files, one or more visualization templates, one or more objects that may be executed to perform one or more algorithms, and/or the like. In embodiments, the export database 310 may be, be similar to, include, or be included in the database 120 depicted in FIG. 1 and/or the database 204 depicted in FIG. 2.

A user device 312 may access evaluation information 308 by sending a request 314 to a services component 316. In embodiments, the user device 312 may be, or be similar to, the user device 112 depicted in FIG. 1; and the services component 316 may be, or be similar to, the services component 110 depicted in FIG. 1 and/or the services component 206 depicted in FIG. 2. In embodiments, the services component 316 may be configured to obtain a set 318 of evaluation information 308 that satisfies one or more criteria specified in the request 314. For example, the request 314 may specify one or more information modules (e.g., the well headers module 210, the production module 212, the completion module 214, the permits and spuds module 216, and/or the reserves and economics module 218) from which the set 318 of evaluation information 308 should be extracted. The request 314, in embodiments, may specify one or more limiting parameters based on which the set 318 of evaluation information 308 should be constructed, one or more formats and/or types of files (e.g., data files, visualization templates, and/or the like), one or more account limitations (e.g., limitations and/or conditions associated with evaluation data to which the user has access, based on an account level or status), and/or the like. As shown, the services component 316 may construct a query 320, based on the request 314, and use the query 320 to extract one or more sets 318 of the evaluation information 308 from the export database 310. The services component 316 may be configured to provide the one or more sets 318 of evaluation information 308 to the user device 312. In embodiments, the services component 316 may interact with the user device 312 via a server such as, for example a web server (e.g., the web server 208 depicted in FIG. 2).

As shown in FIG. 3, the analysis component 306 may include an info-type grouping component 322 that is configured to group the information 302 according to a number of different information-type groups. For example, in embodiments, the info-type grouping component 322 is configured to group the information 302 according to three groups: (1) main well, production, and completions information, (2) spuds and permits information, and (3) information associated with pre-2001 wells that are still producing. According to embodiments, the info-type grouping component 322 may be configured to group the information 302 into any number of other types of groups.

For example, in embodiments, the grouping component 322 may be configured to assign each well to a play and/or a sub-play. To assign each well to a play or sub-play, a number of descriptive parameters may be evaluated and matched against a set of rules that set forth which combinations of descriptive parameters correspond to which play or sub-play. For instance, each well may have an associated descriptor that includes a number of parameters (e.g., in one embodiment, the descriptor may include 7 parameters, while in others, it may include 2, 3, 4, 5, 6, 8, 9, or 10 parameters). To facilitate efficiency, the descriptor may be a single text string that represents a concatenation of the values of the parameters. The grouping component 322 may be configured to apply a set of play-assignment rules to the text string to determine to which or sub-play play a certain well corresponds.

The play-assignment rules may be generated by determining the minimum amount of information required to assign the particular play or sub-play. For instance, where a play covers an entire geologic basin, a parameter value indicating that basin may be enough, in combination with other parameters to assign wells in that basin to the play. In other instances, a combination of basin, producing formation, and depth may be needed to identify the correct play. Any number of different considerations may be incorporated into identifying an optimal set of parameters and the corresponding rules.

As shown, the grouped information 324 may be standardized by a standardizing component 326. In embodiments, standardizing the grouped information 324 may include mapping data values associated with a similar demographic and having disparate values, to a common value. For example, standardizing the grouped information 324 may include mapping alternative names of an operator (e.g., where the operator may include subsidiaries, sister companies, holding companies, divisions, and/or the like) to a common operator name. In embodiments, standardizing the grouped information 324 may include converting values from a first set of units to a second set of units, normalizing values based on common properties, and/or the like. Standardizing the grouped information 324 may, in embodiments, include determining, for each well, a wellhead barrel oil equivalent (BOE), wherein the wellhead BOE represents a standardized measure of a volume of oil and/or gas produced by the well during a specified month, divided by the total number of days in the specified month.

As shown in FIG. 3, the standardized information 328 may be cleaned and/or validated by a cleaning/validating component 330. The cleaning/validating component 330 may be configured to clean and/or validate information according to any number of various types of data cleaning and/or validation techniques. For example, the cleaning/validating component 330 may apply one or more filter criteria to the standardized information 328. The cleaned/validated information 332 may be stored in an import database 334 and may include any number of different descriptors, parameters, and/or metrics. In embodiments, the import database 334 may be, be similar to, include, or be included in the export database 310, the database 120 depicted in FIG. 1 and/or the database 204 depicted in FIG. 2.

As shown in FIG. 3, the analysis component 306 may include a staging component 336 that is configured to perform a number of calculations associated with the cleaned/validated information 332. For example, in embodiments, the staging component 336 may be configured to generate well-level evaluation information 338 on a well-by-well basis. The well-level evaluation information 338 may include any number of metrics associated with a well such as, for example, cumulative production associated with a well, peak production metrics, well characteristics, and/or the like. According to embodiments, peak production metrics may include, for example, peak production, peak BOE production, peak BOE(market) production, peak gas production, peak oil production, peak production per 1000 feet of lateral length, peak BOE production per 1000 feet of lateral length, peak BOE(market) production per 1000 feet of lateral length, peak gas production per 1000 feet of lateral length, and/or peak oil production per 1000 feet of lateral length.

Well characteristics may include, for example, quantitative and/or qualitative values associated with a play, a play sub-region (referred to herein, interchangeably, as a "sub-play"), a play type, an American Petroleum Institute (API) gravity, an API gravity range, an azimuth, a basin, a lifestage, a section name, an operator, an operator type, a peak status, a rate, a lateral length, distance to a nearest neighboring well (e.g., distance between surface holes, heels, midpoints, and/or toes), and/or a well orientation. In embodiments, well characteristics may be associated with commonly-understood definitions and/or additional analysis. For example, a play may be assigned a play type (e.g., conventional, coalbed methane, shale, tight, etc.) based on various types of information about the play, and may be dynamic, periodically reevaluated, and/or the like. Similarly, a sub-play may include, for example, a hand-drawn region determined by an analysis by oil and gas experts, and may be based, for example, on geographic information, geologic information, market information, and/or the like. As with play types, any one or more of the well characteristics may be dynamic, periodically reevaluated, and/or the like.

Various metrics may be determined, and may be used for different purposes. For example, one metric may include a depth from which the well is producing, and may be used to identify similarly-situated wells for purposes of comparing and contrasting various metrics, identifying plays and/or sub-plays that appear to have particular characteristics at certain depths, and/or the like.

Another metric may include the location (e.g., latitude and longitude) of the heel of a horizontal well, and may be used, for example, to better understand drainage characteristics associated with the well and similarly-situated wells. For example, the analytic platform 102 may identify the latitude and longitude of the heel of the well in order to more precisely identify the well direction. In this regard, the analytic platform 102 may incorporate Geographical Information System (GIS) data to determine the azimuth angle for a well. This calculation may further enable the analytic platform 102 to correctly determine the spacing between wells and refine the assignment of wells to their respective plays.

An estimated well cost may also be determined, for example, based on vertical depth, lateral length, and fracture intensity. The estimated cost may be used to generate other metrics such as, for example, an estimated cost relative to a play average, and may be analyzed with production information to obtain financial metrics about cash flow, break even prices, rate of return, net present value, and/or the like. Illustrative, non-limiting, examples of these and other metrics are described in Appendix A of U.S. Provisional Patent Application Nos. 62/181,682, filed on Jun. 18, 2015; and 62/187,202, filed on Jun. 30, 2015, which is incorporated by reference.

As shown in FIG. 3, the well-level evaluation information 338 may be further processed by an aggregating component 340 that is configured to generate evaluation information 308 by performing further calculations associated with multiple wells, groups of wells, and/or the like. The evaluation information 308 may also include the well-level evaluation information 338 and/or the cleaned/validated information 332. In embodiments, the aggregating component 340 may be configured to categorize one or more portions of the well-level evaluation information and/or the cleaned/validated information 332. For example, the aggregating component 340 may be configured to determine well categories based on one or more performance metrics, quintiles based on one or more performance metrics, tiers based on one or more performance metrics, and/or the like. In embodiments, for example, the aggregating component 340 may generate evaluation information for inclusion in a reserves and economics module such as, for example, the reserves and economics module 218 depicted in FIG. 2, as shown, for example, in the non-limiting illustrative set of algorithms described in Appendix B, which accompanies this description and which is incorporated by reference.

The well categories may include, for example, a categorization associated with each well based on a production profile (e.g., a maximum of the first four months of production). The aggregating component 340 may determine quintiles by filtering out information associated with wells having certain characteristics (e.g., spuds and permits, wells that have ceased production, and/or the like), dividing a peak production for each well by the lateral length of the well, determining a normalized revenue generation based on peak BOE for each well, and associating the well with a particular quintile based on the normalized revenue generation. In embodiments, tiers may be used to group high-performing wells (e.g., groups of 100 wells) to facilitate evaluation plays to identify trends, emerging plays and/or sub-plays, and/or the like. For example, a grid of square-mile sections may be created (and may, e.g., be aligned with the Public Land Survey System (PLSS)), and a metric indicating an overall quality (e.g., based on production, economics, and/or the like) may be associated with each section. Various non-limiting illustrative examples of these and other metrics are described in Appendix A, which accompanies this description and which is incorporated by reference.

In embodiments, various economic metrics may be determined and utilized for providing products and services. For example, as shown in Appendix B and Appendix F, which accompany this description and are incorporated by reference, an economics module may be used to generate economic information about wells. Economic information may include drilling costs, completion costs, facilities costs, and/or the like, and may be analyzed in conjunction with other metrics such as, for example, average depth, lateral length, fracture intensity (e.g., pounds of proppant per foot), to generate fixed costs, costs per foot, variable costs, and/or the like. Profit and/or use information may be used to generate adjusted well costs. Various costs may be used to calculate an index, which may be compared to averages, applied to various classifiers, and or the like, examples of which are described in Appendix B.

In this manner, the analytics platform 102 may be configured to provide an estimate as to the costs of creating and/or operating a particular well. These costs may be adjusted to account for the passage of time (e.g., in view of fluctuations in oilfield service costs and the like). These cost figures may be used to identify average costs for particular companies, localities (e.g., plays), national averages, well types, and the like.

The illustrative process 300 shown in FIG. 3 is not intended to suggest any limitation as to the scope of use or functionality of embodiments of the present disclosure. Neither should the illustrative process 300 be interpreted as having any dependency or requirement related to any single component, operation, or order of operations, or combination of components or operations, illustrated therein. Additionally, any one or more of the components or operations depicted in FIG. 3 may be, in embodiments, integrated with various ones of the other components or operations depicted therein (and/or components or operations not illustrated), all of which are considered to be within the ambit of the present disclosure.

Figure 4:
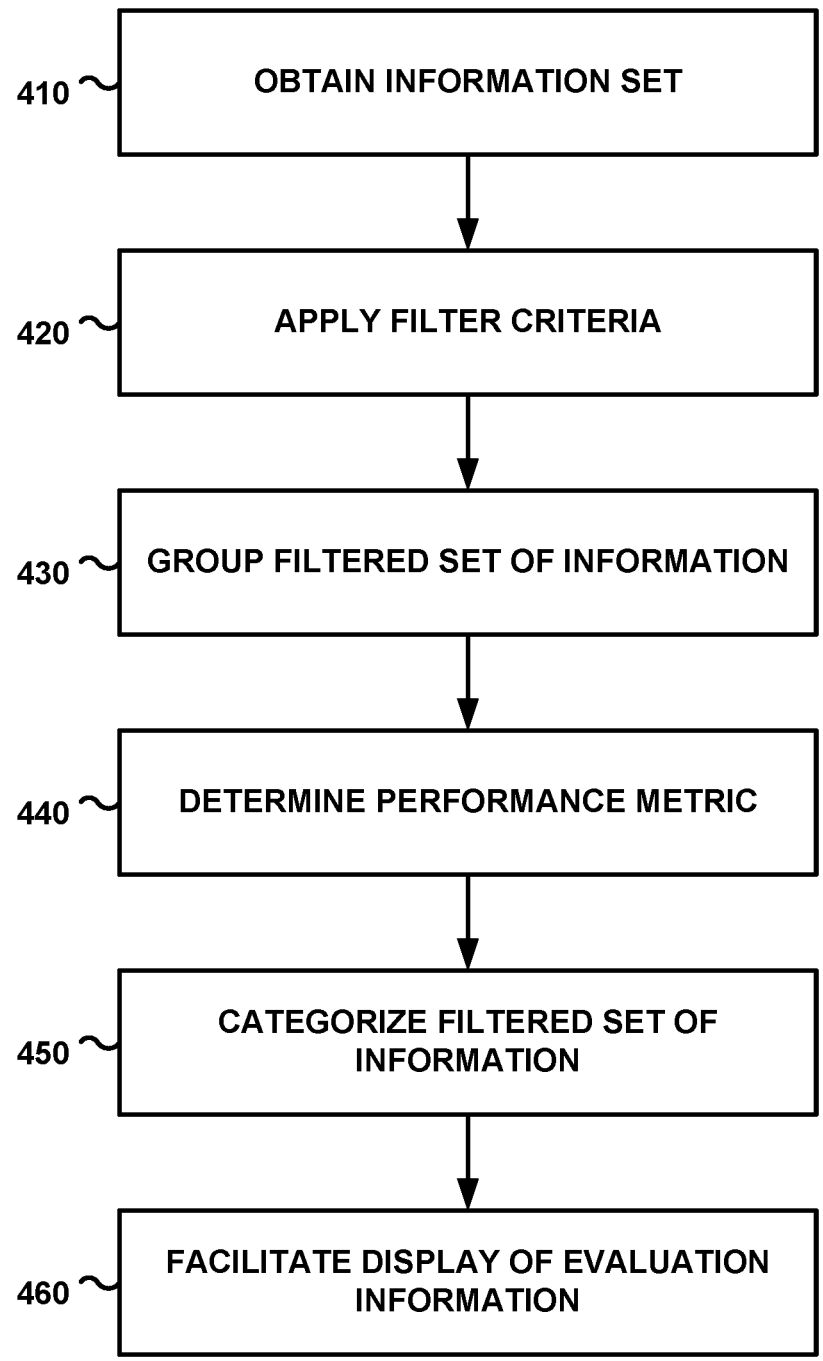
FIG. 4 is a flow diagram depicting an illustrative method of facilitating an information service, in accordance with embodiments of the present disclosure.

As described above, an analysis component (e.g., the analysis component 108 depicted in FIG. 1, the analysis component 202 depicted in FIG. 2, and/or the analysis component 306 depicted in FIG. 3) may analyze information to generate evaluation information, which may be used to provide informational services. FIG. 4 is a flow diagram depicting an illustrative computer-implemented method 400 for providing information services associated with hydrocarbon wells. Embodiments of the illustrative method 400 include obtaining an information set (block 410). As described above, the information set may be obtained, for example, by a retrieving component (e.g., the information retriever 118 depicted in FIG. 1), and may include information items associated with a plurality of hydrocarbon wells. As shown in FIG. 4, one or more filter criteria may be applied to the set of information to create a filtered set of information (block 420). For example, in embodiments, a cleaning/validating component (e.g., the cleaning/validating component 330 depicted in FIG. 3) may be used to apply the filter criteria, which may be configured to filter out data that appears, based on any number of conditions, to be inaccurate, incomplete, and/or the like. In embodiments, the filter criteria may be used to filter information associated with wells that have not been producing long enough to generate desirable levels of information, wells that have stopped producing, and/or the like.

As shown in FIG. 4, embodiments of the method 400 include grouping each information item of the filtered set of information (block 430). For example, in embodiments, grouping each information item of the filtered set of information may include obtaining well characteristic information associated with a first well, where a first subset of information items of the filtered set of information corresponds to the first well; determining, based on the well characteristic information associated with the first well, a well group corresponding to the first well; and associating the first subset of information items with the well group corresponding to the first well. For example, the well group corresponding to the first well may include one of (a) main well, production, and completions; (b) spuds and permits; and (c) pre-2001 wells that are still producing. In alternative and/or overlapping embodiments, any number of other groupings may be used.

Embodiments of the method 400 further include generating, based on the filtered set of information, evaluation information, by determining a performance metric corresponding to at least one well of the plurality of hydrocarbon wells (block 440) and categorizing the filtered set of information (block 450). Generating the performance metric may include calculating a measure of performance of each well; and deriving, for each well, the performance metric using a function that takes, as input, the measure of performance and a well characteristic.

In embodiments, the well characteristic may include a value of at least one of a play, a play sub-region, a play type, an American Petroleum Institute (API) gravity, an API gravity range, an azimuth, a basin, a lifestage, a section name, an operator, an operator type, a peak status, a rate, a lateral length, a well orientation, and/or the like. In embodiments, the performance metric may include a peak production metric, which may include, for example, at least one of peak BOE production, peak BOE(market) production, peak gas production, peak oil production, peak production per 1000 feet of lateral length, peak BOE production per 1000 feet of lateral length, peak BOE(market) production per 1000 feet of lateral length, peak gas production per 1000 feet of lateral length, peak oil production per 1000 feet of lateral length, and/or the like. According to embodiments, categorizing the filtered set of information may include determining quintiles and/or tiers associated with the performance metric; and associating each information item with a quintile and/or tier, respectively, corresponding to the well with which the information item is associated. According to embodiments, the evaluation information may include one or more data files, one or more visualization templates, and/or the like.

As shown in FIG. 4, embodiments of the method 400 further include facilitating display of the evaluation information. In embodiments, facilitating display of the evaluation information may include making the evaluation information available to a user device. For example, a services component (e.g., the services component 110 depicted in FIG. 1, the services component 206 depicted in FIG. 2, and/or the services component 316 depicted in FIG. 3) may be used to facilitate access to the evaluation information such as, for example, by providing an interface to a user device (e.g., the user device 112 depicted in FIG. 1 and/or the user device 312 depicted in FIG. 3).

In some embodiments, the analytics platform 102 obtains an information set comprising information items associated with a plurality of associated hydrocarbon wells, for example, hydrocarbon wells within a play or within a sub-play. The analytics platform 102 uses that information to generate a production estimate for the plurality of hydrocarbon wells. Importantly, the analytics platform 102 is able to generate an accurate estimate of production for a given hydrocarbon well with less than twelve months of production history, which is required for many of the existing estimation techniques. In these embodiments, the analytics platform 102 is able to generate an accurate estimate for the plurality of associated hydrocarbon wells as a group or is able to generate accurate estimates for each of the hydrocarbon wells on an individual basis.

In some embodiments, the analytics platform 102 is configured to improve upon and analyze the information set regarding a plurality of hydrocarbon wells. In some situations, one important aspect of the information set stems from the number of hydrocarbon wells represented in the information set. In other words, an important aspect of certain embodiments is the ability of the analytics platform 102 to efficiently process large volumes of data for many (e.g., hundreds or thousands) of wells. Thus, at the outset of these situations, one technical challenge is to efficiently obtain and accurately process the data within such an information set.

In some embodiments, the analytics platform 102 is configured to obtain the information set using a series of tailored queries. Using those tailored queries, the analytics platform 102 obtains the data of the information set, which may be sorted into two general categories: Well Header Data and Production Data.

Generally speaking, Well Header Data provides contextual information about the hydrocarbon wells, such as the geographic location (e.g., State, County, Latitude, Longitude, and the like), operator information (e.g., the entity responsible for operating and/or digging each hydrocarbon well), and the like. Production Data provides operational information about the hydrocarbon wells, such as data of first production, date of peak production, outputs, well type, and the like.

When the analytics platform 102 uses the tailored queries (or other techniques) to obtain the information set, in many cases that information set may be deemed a "raw" information set because it has missing or incomplete data. For example, the operator data within the information set may be missing or incomplete. For another example, the information set may not associate a hydrocarbon well within a play or may inaccurately assign a hydrocarbon well within a play.

In some embodiments, the analytics platform 102 employs a series of checks to identify and/or correct missing or incomplete data. For example, and as mentioned above, the raw data set may include missing or incomplete date regarding the operator. The analytics platform 102 designates that type of issue as a "warning" and executes cleaning procedures to address the issue. In the case of missing or incomplete operator data, the analytics platform 102 accesses a comprehensive set of operator information and, based on the information provided in the information set, identifies the correct operator and adds and/or corrects the information set using the correct operator. For a specific example, the analytics platform 102 recognizes that the operator name identified for a particular hydrocarbon well is a variant of the correct operator name and replaces the variant with the correct operator name. This provides a consistent data point across all hydrocarbon wells operated by that entity. Other "warning" issues include missing information that may be readily rectified. For example, if a well has a "0" entry for longitude, the warning flag prompts a lookup (either manual or automatic) for the correct longitudinal entry for that well.

The analytics platform 102 may also designate other types of missing or incomplete data as a "failure." Such situations include when a hydrocarbon well is not or cannot be mapped to a play with the data in the information set. To address this issue, the analytics platform implements a specific process for efficiently assigning hydrocarbon wells to a plays, providing consistent and reliable results.

In some embodiments, this process begins by designating a set of pertinent parameters. For example, the set could include a subset of parameters, such as State, County, Basin, Field Name, Well Orientation (e.g., vertical or horizontal). In other embodiments, the subset could include more parameters including for example, 120 different parameters. In yet other embodiments the set of parameters used for assigning plays could include all of the parameters.

Once the set of pertinent parameters is designated, the analytics platform 102 begins with a particular well that has been correctly assigned to a play. In some embodiments, the identification and verification of that assignment is provided by experts and manual review. The analytics platform 102 then creates a rule that will associate future hydrocarbon wells having the same parameter values as that particular well with that play. The analytics platform 102 repeats this process for a plurality of hydrocarbon wells with different parameter values, creating a robust set of rules. This robust set of rules is then used to automatically classify new hydrocarbon wells into the correct plays.

In some situations, the analytics platform 102 may encounter a hydrocarbon well whose parameter values do not match one of the rules in the robust set of rules. In some embodiments, the analytics platform 102 may request and receive expert guidance (e.g., by having an expert manually review the parameters and designate a play) and create a new rule for the parameters provided for that hydrocarbon well and designated play, which is then incorporated into the robust set of rules. In some embodiments, this technique is applied to "clean" other parameter values and may be used in combination with other analytic techniques.

Once the data in the information set has been cleaned, the analytics platform 102 then organizes the hydrocarbon wells into different categories based on the particular data within the data set. The analytics platform 102 may then perform the calculations described above. Generally speaking, the types of calculations performed by the analytics platform 102 include well-specific calculations (i.e., calculations for an individual well), grouping calculations (e.g., assigning wells to plays or to subplays using shape files), and grouped-well calculations (i.e., calculations over multiple wells that have been grouped or classified together based on a common metric or parameter).

Once the pertinent calculations have been performed, the analytics platform 102 converts the results into a human-friendly format. For example, and as discussed above, the results may be in a format that is amenable to visual depiction.

According to some embodiments, the actions taken by the analytics platform 102 may be broken down into different phases. In the first phase, the analytics platform 102 obtains an information set for a plurality of hydrocarbon wells, e.g., using the tailored queries as discussed above. As part of the first phase, the analytics platform 102 may perform some initial cleaning steps on the information set. This may include, for example, identifying data sets for particular hydrocarbon wells that lack any Header Data or Performance Data. In some embodiments, those data sets are discarded. The analytics platform 102 may also standardize the data, e.g., using techniques discussed above. This helps to ensure that subsequent processing steps are performed in a similar manner for all hydrocarbon wells.

The analytics platform 102 then performs additional cleaning functions to the information set, including identifying and flagging anomalies or issues, such as the "warning" issues described above. Once the "warning" issues are resolved, the analytics platform 102 proceeds to the second phase.

During the second phase, the analytics platform 102, either alone or in combination with experts, performs a series of steps for "scrubbing" a list of the plays and a list of operators that are used during subsequent calculations and processing. For example, in some embodiments, the analytics platform 102 is configured to receive the "scrubbed" lists from an expert, who manually performs some or all of the series of steps. During the second phase, data regarding various wells are agglomerated into a single list, after which the information fields for several prominent types of information, such as State, County, Basin, Reservoir, Field, and Well Orientation and the like are populated. The wells are then organized by Basin and Reservoir. At this stage, play information for each well is assigned, for example, using the robust set of rules discussed above. In other embodiments, this "scrubbing" procedure may be part of the process for forming and/or enhancing the robust set of rules. Regarding the list of operators, the analytics platform 102 may be configured to obtain a list of new operators for a predefined time period (e.g., one month). The analytics platform 102 formats that list to match its existing list of operators and then supplements that existing list to create an updated list of operators. This updated list may be used in, e.g., identifying and replacing variant names as discussed above.

In some embodiments, the analytics platform 102 is configured to identify wells associated with particular subdivisions of a reservoir. For example, if a particular reservoir has four subdivisions, the analytics platform 102 can be configured to identify wells associated with each subdivision. In particular, the analytics platform identifies a plurality of wells for that reservoir by using a set of correlated depth measurements of the tops of the reservoirs. The analytics platform 102 obtains additional information for those wells, such as logs, to determine the depths and other information for the wells, which are used to create the association between a well and a subdivision. In some embodiments, the analytics platform 102 includes information regarding the well heels as part of this process.

During the third phase, the analytics platform 102 performs various calculations and analysis on the information set, including, for example, the various steps and analytics described above. During the fourth phase, the analytics platform 102 prepares the resulting data set for subsequent use, which may include formatting the data for use with particular programs, creating or updating hydrocarbon well models based on the data, or performing additional, ad hoc, analysis.

In some embodiments, the analytics platform 102 sorts the hydrocarbon wells represented in the information set into various categories or buckets. For example, in one embodiment the analytics platform 102 creates one bucket for wells created prior to 2001, another bucket is for wells created post 2001, and a third bucket for wells that are not yet producing (i.e., wells at the permit or spud stage). These distinctions may be important, for example, because pre-2001 wells used relatively outdated technologies for drilling, completion, and production. As a result, different analytics may be more pertinent to one bucket of wells than another. In those situations, the analytics platform 102 is configured to selectively apply different analytics to different buckets, tailored to the types of wells in each bucket. Alternatively, the analytics platform 102 may be configured to apply a consistent set of analytics to all the buckets, whether that consistent set is the complete set of analytics or merely a subset of the analytics. For example, a set of production analytics may be applied to all buckets but a different set of analytics (e.g., analytics geared towards newer technology) may be additionally applied only to select buckets (e.g., post 2001 wells). Various aspects of these stages are illustrated in Appendix E, which accompanies this description and which is incorporated by reference.

In some embodiments, the analytics platform 102 is configured to model the oil and gas data along economic lines, e.g., using the economics module 218. To create these models, the economics module 218 uses four general data fields: Cashflow, Capex (Capital Expenditures), Reserves, and Economics. Cashflow represents the estimated historical (or present) cashflow, Capex represents the estimated current capex as well as the estimated historical capex. Reserves represents, e.g., the reserves for a well, discounted reserves, or other reserve estimates generated using various curve parameters, such as B-factor, decline rate, and estimated IP. In these embodiments, estimated IP refers to the estimated production levels during for the initial production by the well, decline rate refers to the initial decline in production of a well during its first year, and the B-factor refers to the rate at which the decline in production changes over time. Economics represents the PV10 break-even benchmark for oil and for gas, where PV10 refers to the present value of estimated future oil and gas revenues, net of estimated direct expenses, discounted at an annual discount rate of 10%.

To generate the Cashflow data field, the analytics platform 102 (e.g., via the economic module 218) generates an estimated revenue for a location (e.g., a well) and subtracts estimated costs, royalties and taxes. To estimate revenue, the analytics platform takes a benchmark price (e.g., the WTI benchmark) and combines that benchmark with a differential factor that will vary from play to play. Thus, by identifying each well or potential well with a particular play, the analytics platform 102 is able to customize the estimate for that particular location. The resulting price estimate is multiplied against the oil production levels (actual or estimated) for that location. A similar process is completed for gas-based revenues, e.g., using Henry Hub as the benchmark along with a differential factor based on the play at issue.

The analytics platform 102 also generates a cost estimate for the Cashflow data field. These costs are separated into three general categories: Fixed Opex, Variable Opex, and other costs. Like the revenue estimate, the analytics platform 102 customizes the cost estimate on a play level. For some locations, play level estimates are not available, and region-level estimates are used instead. Taxes and Royalties are estimated by accessing the particular rates, in some instances, at the play level, along with the estimated revenue and production levels.

For the Capex field, the analytics platform 102 combines estimated drilling costs, completion costs, and facility costs. Generating these figures is facilitated by the organizational techniques employed by the analytics platform 102, which organizes the underlying data into plays and, in some embodiments, sub-plays.

One such calculation involves estimating, at a play level, the capex for a horizontal-type well and a vertical-type well. For those figures, the analytics platform 102 derives a unit cost (e.g., per foot) based on a median well within the play. The target well is then indexed against that median well in order to generate the estimated capex for the target well. Other capex estimation techniques may also be employed, including the incorporation of detailed studies by experts in the industry.

Some of these calculations can be seen in FIGS. 5-8, where reference characters between 500-599 refer to steps involving estimated or calculated figures, reference characters 600-699 refer to data applied across a play, reference characters 700-799 refer to the outputs for well level calculations, and 800-899 refer to well-level figures used in the calculations.

Figure 5:
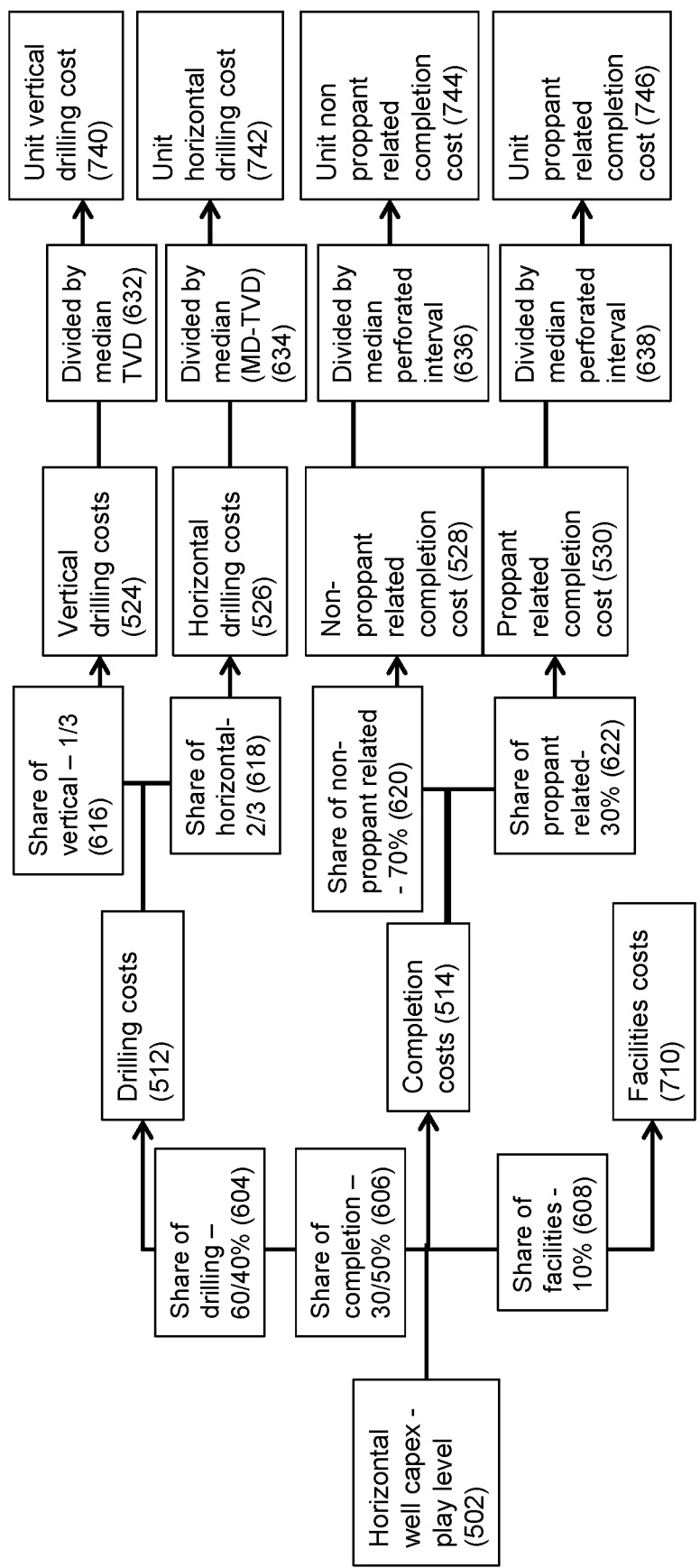
FIGS. 5-6 illustrate flow diagrams for estimating costs for a horizontal well, in accordance with embodiments of the present disclosure.

Beginning with FIG. 5, a process for identifying a horizontal well capex using specific and play level information begins at block 502. The process branches along three lines. On a lower branch, the share of facilities costs (e.g., 10%) are considered (block 608) to calculate the facilities costs (block 710). On the upper branch, the share of completion costs (e.g., ranging from 30-50% in block 606) and share of drilling costs (e.g., ranging from 60-40% in block 604) are considered. The drilling costs (block 512) and completion costs (block 514) are considered along their respective branches. Along the upper branch, the process splits to consider the share of the vertical (e.g., ⅓ in block 616) and share of the horizontal (e.g., ⅔ in block 618). Similarly, the middle branch splits to consider the share of non-proppant related costs (e.g., 70% in block 620) and the share of proppant related costs (e.g., 30% in block 622). Next, the vertical drilling costs (block 524), horizontal drilling costs (526), non-proppant related completion costs (528), and proppant related completion costs (530) are considered along their respective branches. The calculations are then divided by the median true vertical depth (TVD) (block 632), the median value of measured depth (MD) subtracted by the TVD (block 634), and the median perforated interval (blocks 636 and 638, respectively). From these steps, the unit vertical drilling cost (block 740), the unit horizontal drilling cost (block 742), unit non-proppant related completion cost (block 744), and unit proppant related completion cost (block 746) are determined.

Figure 6:
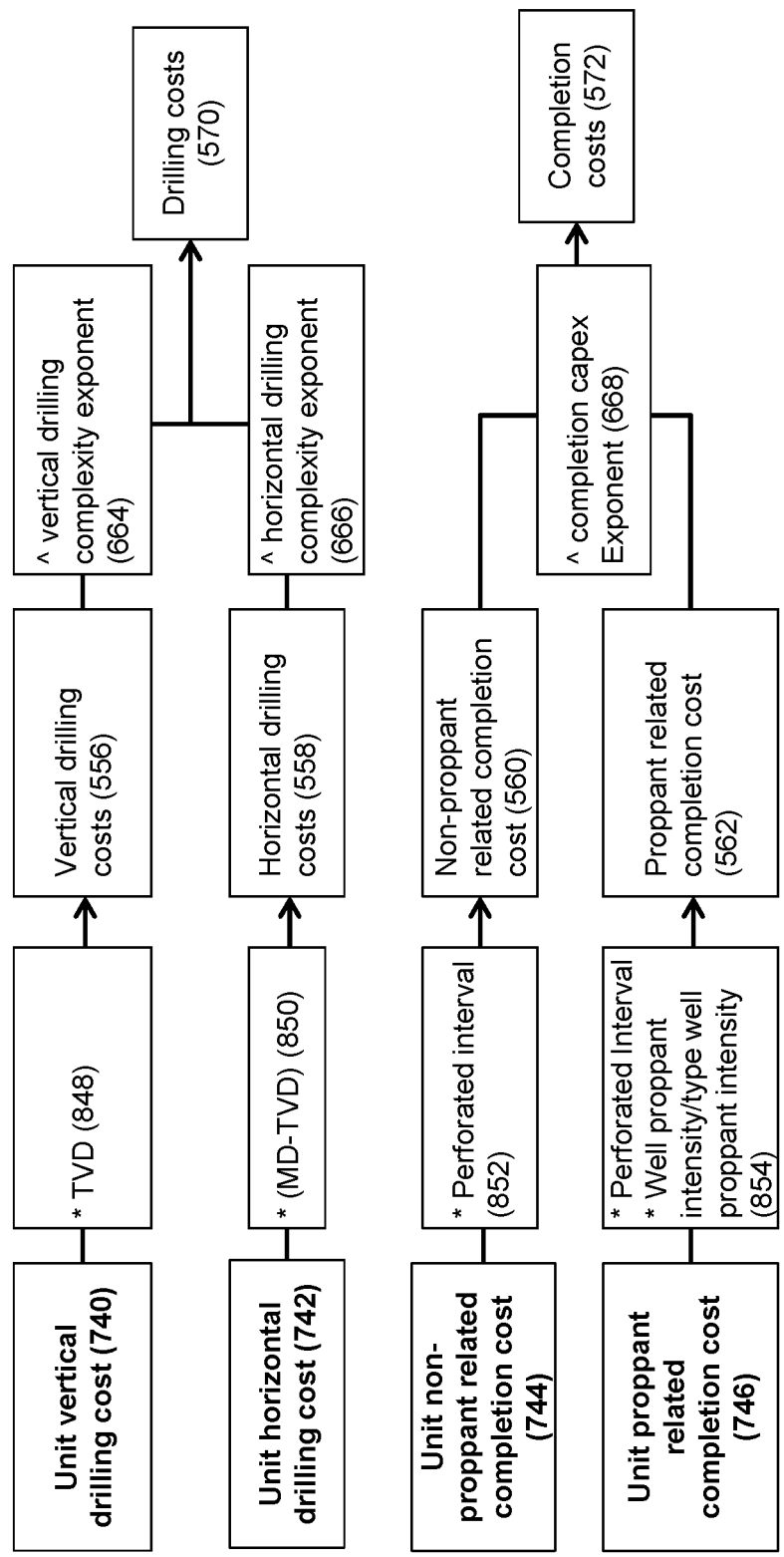

Referring now to FIG. 6, the determined costs 740, 742, 744, and 746 are multiplied by various factors developed at the well level, as shown in block 848, 850, 852, and 854. This results in the specific cost estimates shown in blocks 556, 558, 560, and 562. The vertical drilling costs (556) are then raised to a vertical drilling complexity exponent 664 (which is specific to the play at issue) and the horizontal drilling costs (558) are raised to a horizontal drilling complexity exponent 666 (which is specific to the play at issue). Those values are combined to generate the drilling costs (block 570). The non-proppant related completion costs 560 and the proppant related completion costs 562 are combined and raised by a completion capex exponent (block 668) to generate the completion costs (block 572).

Figure 7:
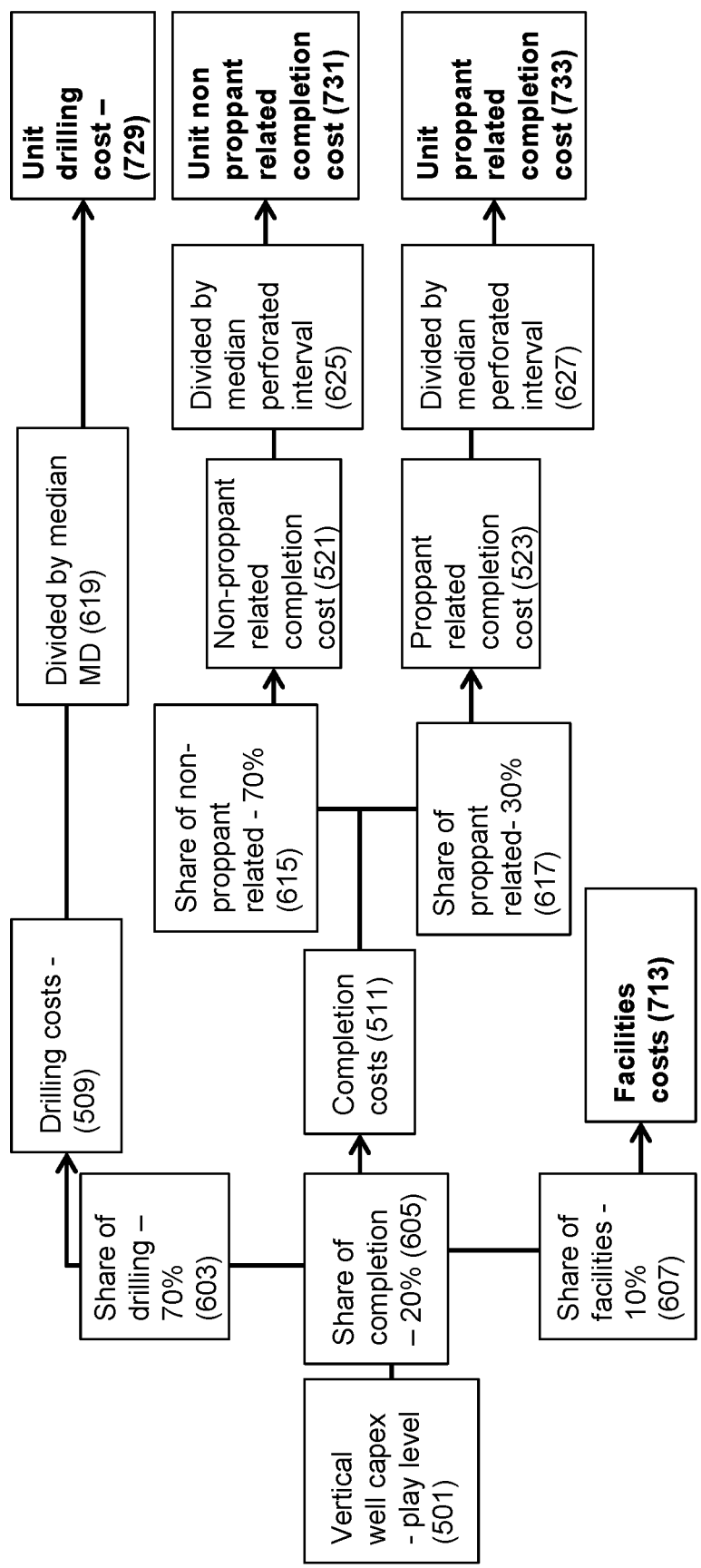
FIGS. 7-8 illustrate flow diagrams for estimating costs for a vertical well, in accordance with embodiments of the present disclosure.
Figure 8:
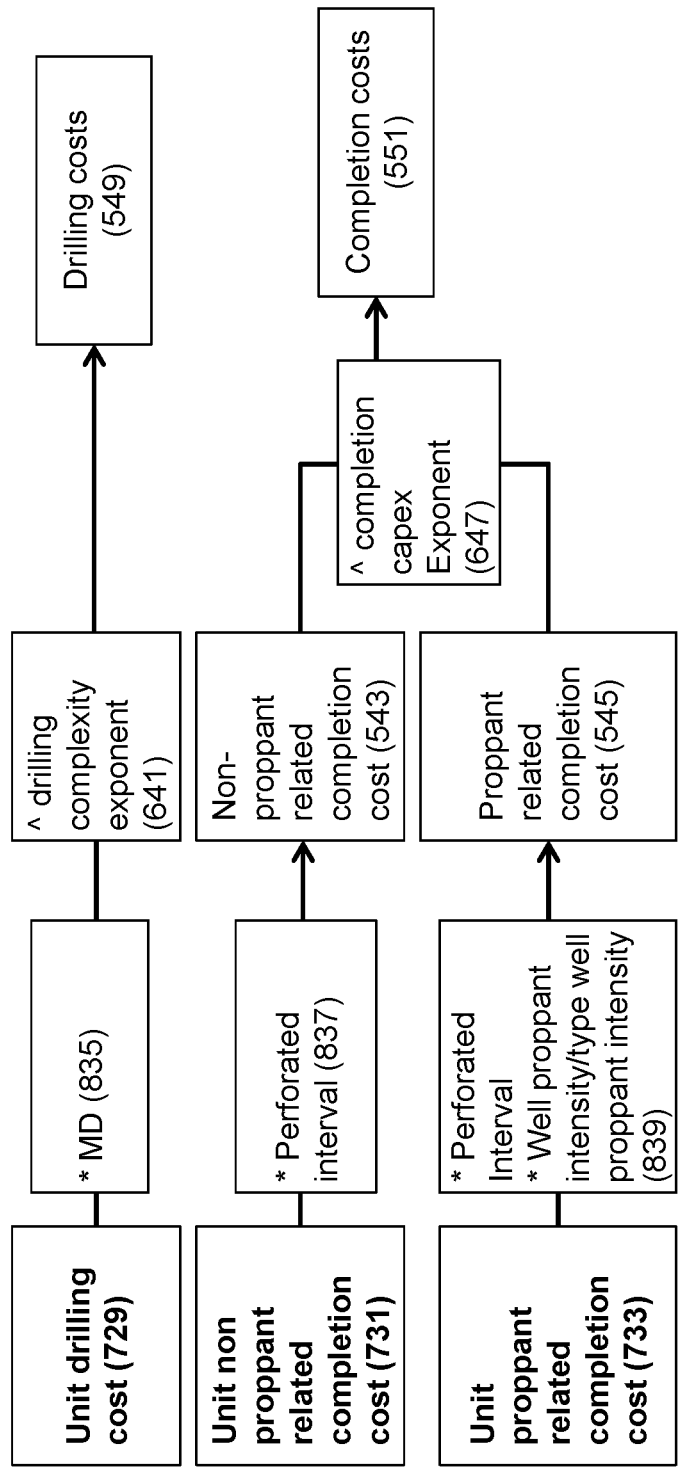

A similar process can be seen for vertical wells, as shown in FIGS. 7 and 8. In FIG. 7, the process begins at block 501 (similar to FIG. 5). The process then branches along three lines. On a lower branch, the share of facilities costs (e.g., 10%) are considered (block 607) to calculate the facilities costs (block 713). On the upper branch, the share of completion costs (e.g., 20% in block 605) and share of drilling costs (e.g., 70% in block 603) are considered. The drilling costs (block 509) and completion costs (block 511) are considered along their respective branches. Along the upper branch, drilling costs are divided by the median MD (block 619) to generate the unit drilling cost (block 729). The middle branch splits to consider the share of non-proppant related costs (e.g., 70% in block 615) and the share of proppant related costs (e.g., 30% in block 617). Next, the non-proppant related completion costs (521) and proppant related completion costs (523) are considered along their respective branches. The calculations are then divided by the median perforated interval (blocks 625 and 627, respectively). From these steps, the unit non-proppant related completion cost (block 731), and unit proppant related completion cost (block 733) are determined.

Referring now to FIG. 8, the determined costs 729, 731, and 733 are multiplied by various factors developed at the well level, as shown in blocks 835, 837, and 839. This results in the specific cost estimates shown in blocks 556, 558, 560, and 562. The calculations along the top branch are then raised to a drilling complexity exponent 641 (which is specific to the play at issue) to generate the drilling costs 549. The non-proppant related completion costs 543 and the proppant related completion costs 545 are combined and raised by a completion capex exponent (block 647) to generate the completion costs (block 551).

Another aspect of the analytics platform 102 and/or the economics module 218 is the ability to estimate the amount of reserves in a well (i.e., the Reserves). In some embodiments, only wells with over six months of production are analyzed. For other wells, the economics module 218 uses the average reserve for wells in that play or quintile. In this regard, the analytics module leverages its organizational techniques to provide additional insights into these wells. In some embodiments, estimating reserves for a well involves creating a curve fit with additional weighting of more recent data, while still giving some weight to all the data over the life of the well. In some embodiments, the curve fitting is performed by a curve fitting engine that uses defined parameters or constraints on the fit parameters that operate at the play level. These parameters include the B-factor and the decline.

The analytics platform 102 and/or the economics module 218 can then use the Cash Flow, Capex, and Reserve information to determine the economics of a particular well. For example, in some embodiments, the analytics platform 102 determines the break-even benchmark price that realizes a present value of zero at a 10 percent discount rate. This can be done separately for oil and for gas. In some embodiments, this calculation assumes a static price for gas and for oil, or could feature dynamic prices that reflect current conditions.

While embodiments of the present disclosure are described with specificity, the description itself is not intended to limit the scope of this patent. Thus, the inventors have contemplated that the claimed invention might also be embodied in other ways, to include different steps or features, or combinations of steps or features similar to the ones described in this document, in conjunction with other technologies.

The following is claimed:

1. A computer-implemented method for organizing and analyzing large volumes of hydrocarbon well data stored in a tangible computer-readable media using an organizational scheme that arranges the data around spatial patterns, well characteristics, and calculated performance measures, the method comprising:
   accessing a volume of data representing a plurality of hydrocarbon wells using one or more processors, the volume including a plurality of parameters associated each of the plurality of hydrocarbon wells;
   applying one or more play-assignment rules to the volume of data using the one or more processors to assign each of the plurality of hydrocarbon wells to a sub-play;
   grouping hydrocarbon wells assigned to a sub-play using the one or more processors to generate organizational headers to the volume of data organized around sub-play spatial patterns;
   creating data entries in a tangible computer-readable media storing the volume of data organized around sub-play spatial patterns using the one or more processors;
   generating, using one or more processors and based on the subsets of the volume of data organized around sub-play spatial patterns, at least one performance metric corresponding to at least one hydrocarbon well of the plurality of hydrocarbon wells; and
   facilitating display of the at least one performance metric.

2. The method of claim 1, further comprising a step of collapsing data associated with a group of related hydrocarbon wells in order to collectively represent those hydrocarbon wells as if they were a single well.

3. The method of claim 1, wherein applying the one or more play-assignment rules using the one or more processors to the volume of data to assign each of the plurality of hydrocarbon wells to a sub-play includes:
   identifying an exemplary hydrocarbon well assigned to a particular sub-play;
   identifying particular values for at least some of the parameters for that exemplary hydrocarbon well; and
   comparing those particular values against corresponding values for other hydrocarbon wells to determine whether the other hydrocarbon wells should be assigned to the particular sub-play.

4. The method of claim 1, further comprising a step of generating the one or more play-assignment rules by:
   identifying a first hydrocarbon well assigned to a first sub-play;
   identifying particular values for at least some of the parameters for the first hydrocarbon well; and
   comparing those particular values against corresponding values for other hydrocarbon wells to determine whether those other hydrocarbon wells should be assigned to the first sub-play;
   if at least one of the other hydrocarbon wells is not assigned to the first sub-play, identifying a second hydrocarbon well assigned to a second sub-play, identifying particular values for at least some of the parameters for the second hydrocarbon well; and comparing those particular values against corresponding values for the at least one other hydrocarbon well to determine whether the at least one other hydrocarbon well should be assigned to the second sub-play.

5. The method of claim 1, further comprising generating a single text string that represents a concatenation of the plurality of parameters for each of the plurality of hydrocarbon wells.

6. The method of claim 1, wherein applying one or more play-assignment rules to the volume of data using the one or more processors includes analyzing a latitude and a longitude of a heel of a horizontal hydrocarbon well in order to determine a location and an azimuth angle for that horizontal hydrocarbon well.

7. The method of claim 6, wherein the location and azimuth angle are used to identify a relative spacing between that horizontal hydrocarbon well and another hydrocarbon well, with the relative spacing being a parameter used to determine whether or not that horizontal hydrocarbon well is assigned to the same sub-play as the other hydrocarbon well.

8. The method of claim 1, further comprising:
   using the subsets of the volume of data organized around sub-play spatial patterns to generate median information for the plays or sub-plays; and
   generating a model representing the viability of hydrocarbon wells within those plays or sub-plays.

9. The method of claim 1, wherein the at least one performance metric comprises a peak production metric, the peak production metric comprising at least one of peak production, peak BOE production, peak BOE(market) production, peak gas production, peak oil production, peak production per 1000 feet of lateral length, peak BOE production per 1000 feet of lateral length, peak BOE(market)

production per 1000 feet of lateral length, peak gas production per 1000 feet of lateral length, and peak oil production per 1000 feet of lateral length.

10. The method of claim 1, further comprising generating, based on the subsets of the volume of data organized around sub-play spatial patterns, quintiles of performance metrics and assigning hydrocarbon wells to different quintiles based on their parameters.

* * * * *